United States Patent
Russ

[15] 3,680,717
[45] Aug. 1, 1972

[54] BALE STOOKER

[72] Inventor: John H. Russ, Stockton, Kans. 67669

[22] Filed: Dec. 2, 1970

[21] Appl. No.: 94,378

[52] U.S. Cl. ................ 214/6 B, 280/403, 280/488
[51] Int. Cl. ............................................. B65g 57/32
[58] Field of Search....105/8; 214/6 B; 280/457, 480, 280/403; 280/446 R, 488

[56] References Cited

UNITED STATES PATENTS

| | | | |
|---|---|---|---|
| 3,375,940 | 4/1968 | Thompson et al. | 214/6 B |
| 3,370,719 | 2/1968 | Oler | 214/6 B |
| 3,034,832 | 5/1962 | Barrington | 214/6 B |
| 3,443,708 | 5/1969 | Blair | 214/6 B |
| 2,670,951 | 3/1954 | Lucky | 280/480 X |
| 1,599,353 | 9/1926 | Albin | 280/480 X |
| 3,445,006 | 5/1969 | Fleming | 214/6 B |
| 3,223,253 | 12/1965 | Garbe et al. | 214/6 B |
| 2,659,609 | 11/1953 | Johnson | 280/480 |
| 1,379,485 | 5/1921 | Stuart | 280/480 |
| 3,302,807 | 2/1967 | Blair | 214/6 B |

*Primary Examiner*—Robert J. Spar
*Attorney*—Scofield, Kokjer, Scofield & Lowe

[57] ABSTRACT

A stooker frame which is pivotally coupled to a hay baler and has flexible rail members interconnecting the frame and baler which serve as bale guides. The frame is supported by non-swiveling, ground engaging wheels.

1 Claim, 5 Drawing Figures

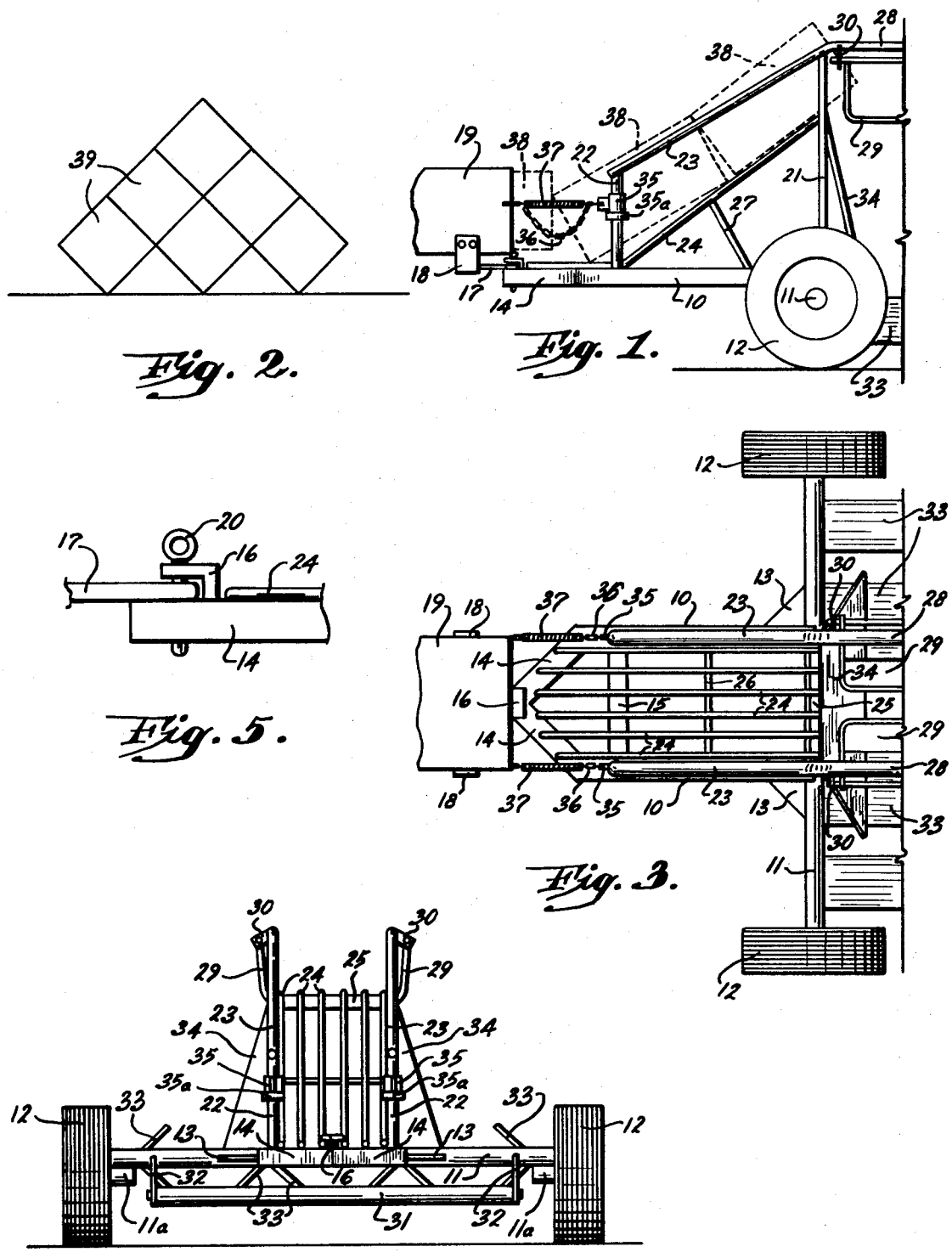

BALE STOOKER

BACKGROUND AND SUMMARY OF THE INVENTION

This invention relates to bale stookers and is an improvement in the stooker disclosed in U.S. Pat. No. 3,158,270 by W. Prentice, issued Nov. 24, 1964, entitled "Stooker for Traveling Baler."

The general intent of bale stookers is to stack bales into a six bale pyramid for curing purposes. The three bottom bales (forming the base of the pyramid) rest on a longitudinal edge which provides minimum contact with the ground and therefore, virtually eliminates the absorption of ground moisture. In this manner, the bales are thoroughly ventilated and complete drying is achieved.

A bale stooker, of which this invention is an improvement, characteristically includes a frame construction which is rigidly connected to the bale discharge chute of a hay baler. Because of this rigid connection to the baler, the frame is supported on swivel type castor wheels which are necessary to permit the unit to be turned. Bales discharged from the baler are pushed onto the frame and up an inclined ramp to a dumping platform positioned above a cradle assembly on which a six bale pyramid is formed. When a bale is pushed completely onto the dumping platform, a trip mechanism is activated which drops the bale to the cradle. After the pyramid pile is completed on the cradle, the operator activates a release lever which causes the pile to be deposited on the ground as the stooker is advanced in trailing engagement with the hay baler.

Since the bale stooker is rigidly connected to the baler discharge chute, any resistance whatsoever to turning of the unit places extreme shearing stress on the discharge chute. During a turn, such as at the corner of the field, this type of resistance is present when the castor wheels move laterally with respect to the windrow.

In addition, and because of this rigid connection, the stooker swings through a large arc when the baler is turned. Contact with the fence and fence posts, particularly in small fields, as well as contact with previously stacked bales, requires extra driving skill and effort to prevent damage to the machine or knocked over bale piles.

It is not infrequent that baling and stooking are done when the fields may be damp and muddy. In fact, as those skilled in this art realize, the weather is a critical factor in hay baling operations and it is often necessary to get into the fields quickly before the next thunderstorm. In this respect, the previously described stooker has a serious disadvantage. If the field is damp, then mud tends to ball up around the swivel wheels. This condition makes the wheels drag and not only causes ruts in the field, but also causes deep gouges when the stooker is turned.

The primary object of this invention is to provide a bale stooker which eliminates the disadvantages and problems associated with commercially available units.

More specifically, an object of the invention is to provide a bale stooker adapted for trailing connection behind a hay baler and which causes no excessive wear to the discharge chute thereof.

Another object of the invention is to provide a bale stooker adapted for trailing connection behind a hay baler and for use in damp and muddy fields without leaving ruts and gouges. Such is accomplished by pivotally, rather than rigidly, connecting the stooker to the baler and by using non-swiveling wheels to support the stooker. The former feature achieves handling ease in the field and diminishes the likelihood of equipment damage or spilled bale piles.

A further object of the invention is to provide a bale stooker of the character described having rail members which prevent bales from falling off the machine. Even when the stooker pivots with respect to the baler, such as during a turn, the rail members preserve alignment of the bales and prevent bales from falling.

Other and further objects of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals are employed to indicate like parts in the various views:

FIG. 1 is a side elevational view of a bale stooker constructed in accordance with a preferred embodiment of the invention and shown connected to a baler machine;

FIG. 2 is an end view of a pile of bales in pyramid form on the ground as it would appear after being discharged from the stooker;

FIG. 3 is a plan view of the stooker connected to a baler machine, a portion of which is shown;

FIG. 4 is a front end view of the stooker; and

FIG. 5 is an enlarged, fragmentary side view of the hitch connection between the baler machine and the stooker as shown in FIG. 1.

Referring to the drawing in more detail, the supporting carriage or frame of the bale stooker includes side frame bars 10 attached at the rearward ends thereof to a horizontal axle 11. Rigidly attached to the axle 11 are offset spindles 11a on which are mounted rotatable wheels 12. Triangular plates 13 are attached to the axle 11 and side bars 10 to provide additional support. Near their forward ends, the side bars 10 are attached to inwardly sloped end members 14 and are cross braced with a tie bar 15 as seen in FIG. 3.

At the juncture of the end members 10 is rigidly attached an L-shaped tongue plate 16. As best illustrated in FIG. 5, the tongue 16 and end members 14 receive therebetween a hitch 17 which is mounted on a bracket 18 connected to and extending beneath the bale discharge 19 of the hay baler. A removable pin 20 is fitted through holes in the tongue 16, hitch 17, and end members 14 to pivotally connect the stooker to the baler.

Rear uprights 21 are connected to the side frame bars 10 near the axle 11 and front uprights 22 are connected to the frame bars 10 adjacent the tie bar 15 and are somewhat shorter than the rear uprights 21. Interconnecting the upper ends of the front and rear uprights 22 and 21, respectively, are side rails 23. A plurality of ramp members 24 extend from the end members 14 to the tie bar 15 and are then bent upwardly to provide an inclined ramp and to extend to a cross brace 25 interconnecting the rear uprights 21. Additional support and rigidity for the ramp members 24 is provided by a cross tie member 26 and bracing members 27.

Connected to the upper ends of the rear uprights 21 and extended rearwardly are horizontal members 28 that pivotally carry bale dumping arms 29 mounted on bracket members 30.

A horizontal bar 31, as viewed in FIG. 4, is pivotally suspended beneath the axle 11 by a pair of struts 32. Attached to the horizontal bar 31 and projecting rearwardly therefrom are bale guide plates 33 that form a cradle on which the pyramid pile of bales is formed. Extending downwardly to the bale guide plates 33 from the cross brace 25 of the uprights is a sloped guiding panel 34.

Further structural and operational details of the bale dumping arms 29 and guide plates 33, as well as the construction of the trip mechanism for activating the arms 29 and the release mechanism for discharging a pyramid pile from the cradle can be found in U.S. Pat. No. 3,158,270 by W. Prentice, issued Nov. 24, 1964. For the sake of brevity, the latter two mechanisms are not shown or structurally described herein.

As viewed in FIG. 1, each front upright 21 is equipped with a swivel collar 35 which is supported on a clamp 35a fitted around the upright 21. The collar 35 is connected to one end of a chain 36, while the other end of the chain 36 is connected to the side of the bale discharge 19. In order to permit turning the stooker, the chain 36 is of greater length than the distance between the end of the bale discharge 19 and the collar 35 as viewed in FIG. 3. A spring 37 is connected at one end to a link in the chain 36 near the collar 35 and, at its other end, to a link in the chain 36 near the bale discharge 19. These springs 37 are preferably encased in a flexible tubing for increased longevity.

In operation, the hay bales 38 are discharged to the stooker from the bale discharge 19 as the stooker is towed through the field behind the hay baler. Subsequent bales discharged from the baler push the previously discharged bales onto the ramp members 24 and upwardly on the inclined ramp. Therefore, to insure best performance, the ramp members 24 which form the horizontal section of the ramp are preferably level with, or slightly below, the discharge chute 19.

Between the bale discharge 19 and the front uprights 22, the bales are held on the ramp members 24 by the flexible guides provided by the chains 36 and springs 37 connected therebetween. Along the inclined ramp, the bales are held thereon by the side rails 23. At the upper end of the inclined ramp, the leading bale is pushed onto the bale dumping arms 29. When pushed onto the dumping arms 29 far enough, the bale activates a trip mechanism (not shown) which causes the dumping arms 29 to open and permit the bale to fall onto the cradle provided by the guide plates 33 mounted on the horizontal bar 31. The subsequent bales dumped onto this cradle form a pyramid pile. When six bales have been discharged to the cradle to complete the pyramid form, the operator activates a release lever (not shown) which causes the cradle to pivot downwardly, and, as the stooker advances, the bales are pulled from the cradle and left on the ground in the form of a pyramid such as seen in FIG. 2 (the bales thereof indicated by the numeral 39).

When turning a corner, the bale stooker is permitted to pivot about the hitch 17 on the removable pin 20. The spring 37 on the side opposite the direction of the turn will be distended during the turn. In the event a bale is lodged between the bale discharge 19 and the stooker itself, the bale will bend during the turn and, at the same time, be retained on the machine by the chain 36 and spring 37.

Because of this pivotal connection of the stooker to the hay baler, therefore, it is possible and beneficial to employ nonswiveling wheels 12 and thereby eliminate the use of castor wheels which may cause deep gouges in the field. This also has an added advantage in that the stooker can be employed when the fields are damp and muddy, without the wheels becoming clogged an inoperative.

From the foregoing, it will be seen that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A bale stooker for pivotal trailing connection to a hay baler, said stooker comprising:
   a. a stooker frame for receiving bales from said hay baler and stacking said bales in a pyramid form;
   b. non-swiveling, ground-engaging rotatable wheels mounted on said frame;
   c. a rigid towing tongue connected to said stooker frame for coupling said frame in trailing engagement behind said baler;
   d. pin means associated with said tongue for pivotally connecting said frame to said baler; and
   e. flexible guide means interconnecting said baler and said frame for guiding the bales from said baler onto said frame, said guide means comprising a pair of chains interconnecting said frame and said baler, and a pair of resiliently flexible spring members, each said spring member connected across a portion of one said chain whereby the chain forms a depending loop beneath said spring member.

* * * * *